United States Patent [19]

Van Wuytswinkel

[11] 3,960,230
[45] June 1, 1976

[54] MOTOR DISCONNECT MEANS

[75] Inventor: Charles M. G. Van Wuytswinkel, Thimeon, Belgium

[73] Assignee: Caterpillar Tractor Co., Peoria, Ill.

[22] Filed: Jan. 23, 1975

[21] Appl. No.: 543,575

[52] U.S. Cl. .................................. 180/9.62; 74/405
[51] Int. Cl.² .......................................... B60K 17/10
[58] Field of Search ............ 180/9.62, 44 M; 74/405

[56] References Cited
UNITED STATES PATENTS

| | | | |
|---|---|---|---|
| 3,504,564 | 4/1970 | Kell | 74/405 |
| 3,800,901 | 4/1974 | Blomstrom | 180/9.62 |

*Primary Examiner*—Philip Goodman
*Attorney, Agent, or Firm*—Phillips, Moore, Weissenberger Lempio & Strabala

[57] ABSTRACT

A disconnect system for selectively disconnecting a final drive motor means from its associated traction means in an earthmoving vehicle. The system includes a floating splined shaft disposed along the center line of the final drive casing. The casing includes cover plate means with alternate drain positions and means so that the cover plate means is interchangeable and may be used in connection with the final drive casing on either side of the vehicle.

11 Claims, 6 Drawing Figures

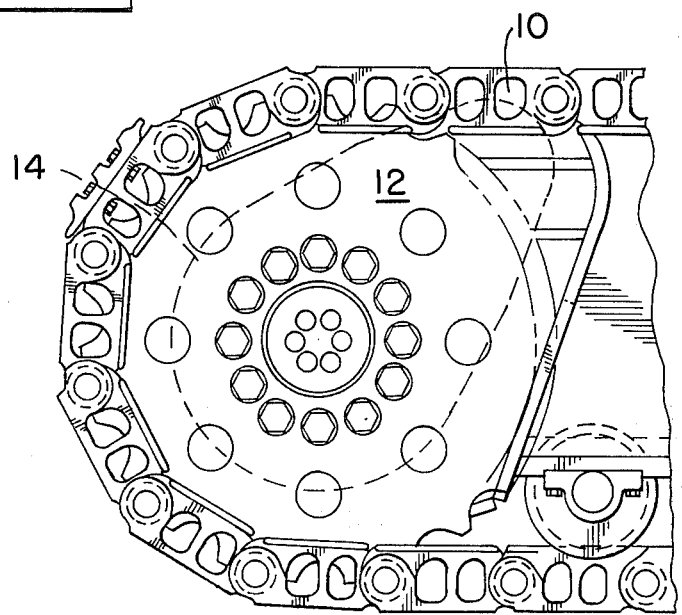
Fig_1_
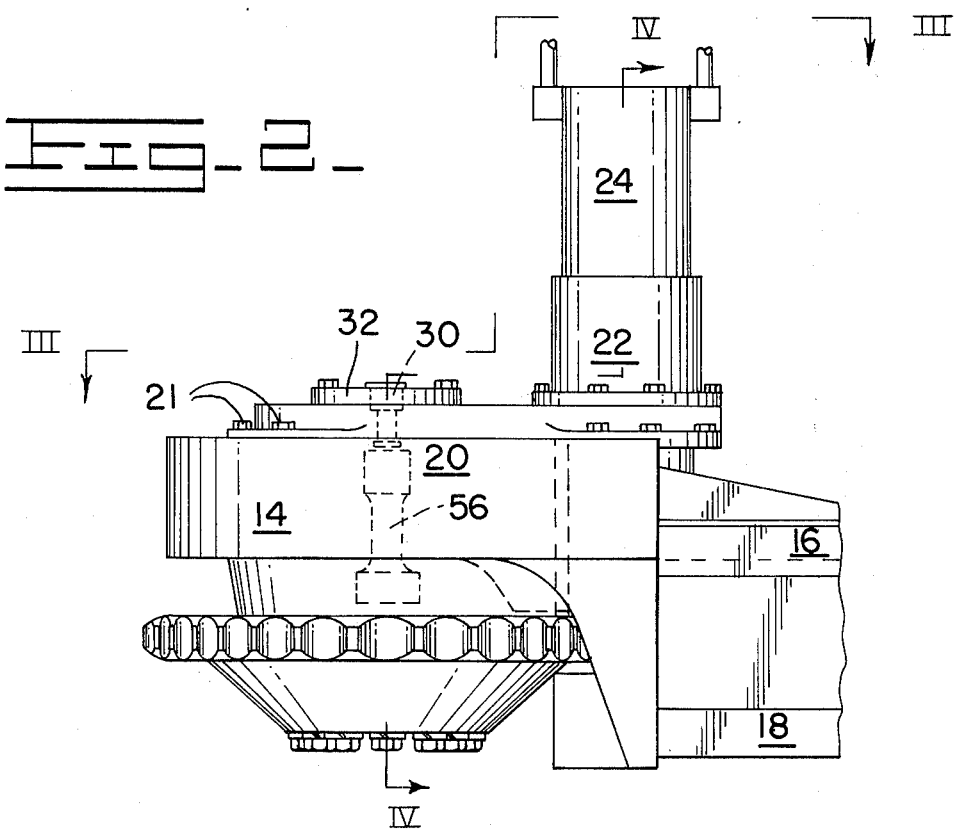
Fig_2_

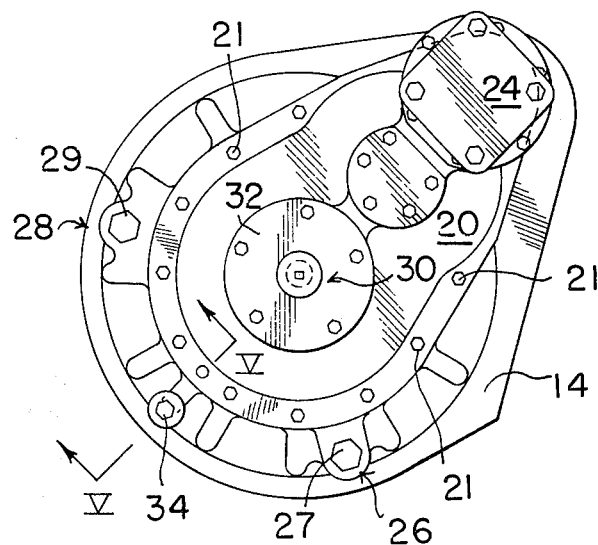
Fig_3_
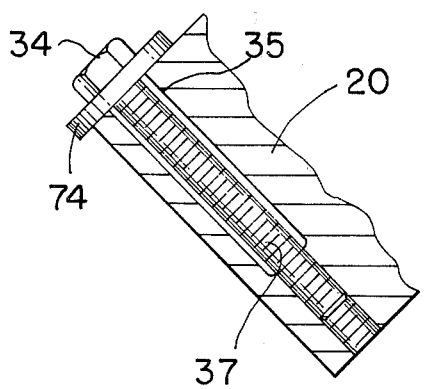
Fig_5_
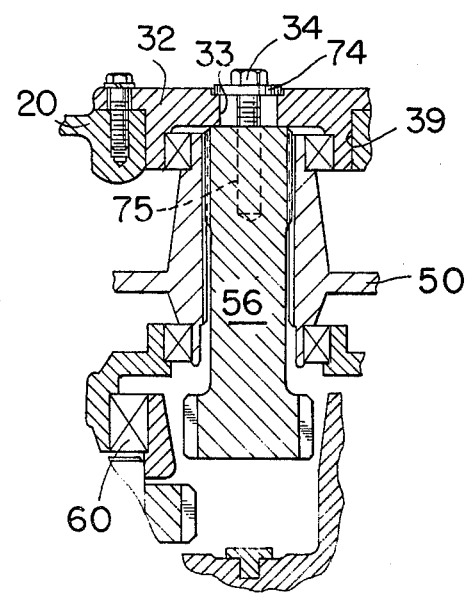
Fig_6_

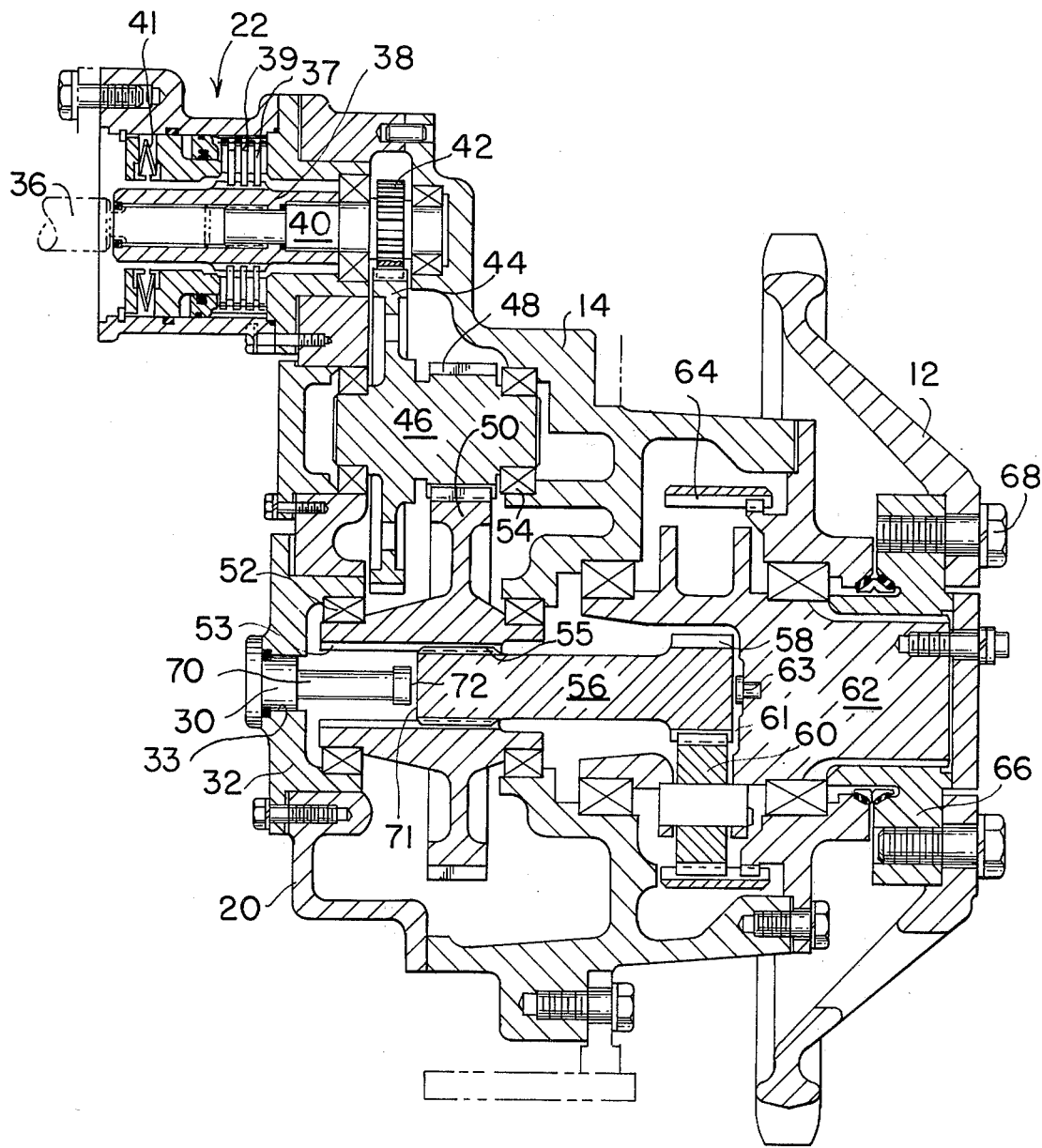

MOTOR DISCONNECT MEANS

CROSS REFERENCE TO RELATED APPLICATIONS

This invention relates to the inventions disclosed in U.S. patent applications Ser. No. 211,368, now U.S. Pat. No. 3,800,901, to Blomstrom et al. entitled "FINAL DRIVE DECOUPLING AND PARKING BRAKE ARRANGEMENT FOR HYDROSTATIC LOADER", Ser. No. 311,823, now U.S. Pat. No. 3,807,249, to Cheek et al., entitled "DISCONNECT MEANS-JAW CLUTCH TYPE", and Ser. No. 244,413, now U.S. Pat. No. 3,744,331, to Caldwell, entitled "DISCONNECT DEVICE", each such application being of common assignment herewith.

BACKGROUND OF THE INVENTION

Heavy earthmoving vehicles in which failure in the power train or other major component occurs must frequently be towed to repair facilities for servicing. At such times, it is desirable to have a quick and simple means for disconnecting the final drives of such vehicles from the traction units thereof in order to avoid the forceable turning of the gear train with consequent damage to such gear train and to the final drive motor due to operation thereof in a lubricant starved condition during towing.

Furthermore, a normally spring force applied hydraulically released brake unit is commonly integrated with the final drive system as a safety feature. In such brake-equipped vehicles, failure of the power plant or related auxiliary equipment, such as a hydraulic fluid system, frequently prevents the hydraulic release of the brake system so as to require special mechanical provisions for release of the brake before towing can commence. Thus, there is a need for a disconnect system which selectively decouples both the final drive and brake mechanism of the vehicle to allow unimpeded towing for repairs.

Another particularly vexing problem has been to design a universal final drive casing which in association with a disconnect system can be utilized in connection with the final drive unit on either side of the vehicle without modification. Such provisions would result in tremendous savings in time and manufacturing processes as well as in storage and shipment costs.

Some partial solutions to the noted problems are offered by the constructions disclosed in U.S. patent applications Ser. Nos. 211,368, 244,413, and 311,823, cited above. However, none of the referenced systems teach an interchangeable final drive casing or the extremely simple means associated therewith for disconnecting the final drive of the vehicle from the traction means thereof which are presented herein.

SUMMARY AND OBJECTS OF THE INVENTION

This invention relates to a means for disconnecting the final drive in an earthmoving vehicle from he traction means thereof during towing operations or the like. More particularly, this invention relates to a disconnect means appropriately associated with a portion of a final drive casing in such a way that it and the casing may be utilized in association with the final drive on either side of the vehicle. The device includes a casing having a plurality of alternatively positionable drain means to provide for interchangeable use on either side of the vehicle. The disconnect system includes a floating spline shaft means disposed along the center line of the final drive casing to provide such interchangeability.

The floating splined shaft is drawn, by means of a threaded bolt, axially out of mating engagement with the gearing associated with the traction means when it is desired to disconnect such traction means from the final drive. When not is use, said threaded pull bolt is stored within a compartment in the final drive casing.

It is an object of this invention to provide an inexpensively fabricated and operated means for disconnecting the final drive means of an earthmoving vehicle from the traction means thereof.

It is another object of this invention to provide final drive disconnecting means which are associated with an interchangeable final drive casing which may be used in connection with the final drive unit on either side of the vehicle.

Another object of the invention is to provide a disconnect means including a floating splined shaft for selectively engaging or releasing a gear member which connects the final drive motor and the traction means.

A further object of the present invention is to provide readily available and inexpensive bolt means for axially positioning the floating splined shaft to selectively connect or disconnect the final drive motor from the traction means.

It is another object of this invention to provide a final drive casing used in connection with the present disconnect system which includes a plurality of strategically positioned drain means for draining the associated final drive in a plurality of positions.

Other objects and advantages of the invention will become apparent from the following description and drawings.

BRIEF DESCRIPTION OF THE DRAWINGS

FIG. 1 is an elevation of a portion of the undercarriage of a track-type earthmoving vehicle showing the general disposition of the final drive means and track driving means incorporated with the instant disconnect system;

FIG. 2 is a partial plan view of the components of FIG. 1;

FIG. 3 is a partial interior elevation of the components shown in FIG. 2 taken along the line III—III therein;

FIG. 4 is an enlarged sectional view of the system taken along the line IV—IV in FIG. 2;

FIG. 5 is an enlarged partial view of a portion of the system showing the casing storage area for the disconnect pull bolt; and FIG. 6 is an enlarged partial sectional view of the floating disconnect shaft and pull bolt means disposed in a final drive disconnect orientation.

DETAILED DESCRIPTION

Referring more particularly to the drawings, the final drive disconnect system of the present invention is shown associated with traction means of an earthmoving vehicle, such as an excavator, comprising a track chain assembly 10 and a driving sprocket 12. The assembly is shown in FIG. 1 as it appears to an external viewer positioned on the right hand side of the vehicle. The machine is equipped with a left hand track assembly (not shown) which is a mirror image of that shown in FIG. 1.

Sprocket 12 is driven by a gear train contained within a final drive casing or housing means 14 as best shown in FIG. 4. Input torque from a motor shaft 36 is transmitted through a gear train 40,42,44,48,50,60,etc. to drive the sprocket 12. The system is provided with a spring applied-pressure released disc brake unit shown generally at 22. A standard fluid drive motor 24 is connected to the input shaft 36 as shown in FIGS. 2 and 3.

As shown in FIG. 2, the final drive housing means 14 is secured by means of conventional bolts to a pair of track roller frames 16 and 18 which are part of the undercarriage of the vehicle. On the interior side (as seen from between the opposite traction means) of the housing 14, a cover plate structure 20 is attached. As shown in FIGS. 2 and 3, the cover plate is fastened to the housing at a plurality of points by bolts 21. Attached to the cover plate 20 is a disconnect cap member means 32 within which is journaled the hub portion of a gear 50. Also fastened to the cover plate means 20 by suitable bolt means are the brake housing 22 and fluid motor housing 24.

The cover plate 20 is equipped with two drain aperture means shown generally at 26 and 28 angularly spaced apart as shown in FIG. 3. The aperture means communicate with the interior of the final drive housing and interior fluid may be drained therefrom through such apertures. Each aperture means is equipped with a plug 27,29. Because of the geometry of the alternate drain means and because the axially moving components of the disconnect means are positioned along the center line of the cap member 32 (discussed more fully hereinafter), the cover plate means 20 may be installed on the final drive on either the right or left hand side of the vehicle. This interchangeability capability makes it necessary to manufacture only one cover plate configuration for the vehicle.

As shown in FIG. 4, the shaft 36 from the fluid motor 24 is internally spline connected to a gear member 38 which in turn is spline connected to a shaft 40 having gear teeth 42 machined thereupon. The member 38 is externally splined to a plurality of discs 37 which coact selectively with a plurality of plates 39 of the brake mechanism 22. The brake is actuated by means of a mechanical spring means 41 at such times as fluid pressure is not applied to separate the discs and plates 37,39 from engagement.

The gear teeth 42 mesh with the teeth of the gear 44 which is machined upon a hub 46 having an axially displaced tooth set 48 thereupon. The teeth 48 mesh with the teeth of gear 50 which is journaled within a pair of bearings 52,54 and which has internal splines 53 thereupon. The splines 53 are adapted to engage splines 55 of a floating shaft 56. On the opposite end of the shaft 56 splines 58 coact with the teeth of a plurality of planet gears 60 which in turn coact with a ring gear 64 to rotate a carrier 62. The planet carrier is spline connected to a member 66 which is in turn bolted to the sprocket 12 by means of a plurality of bolts 68.

It may be noted that the cap member 32 is provided with a central opening 33. With the system in its normally connected orientation, as shown in FIG. 4, the opening 33 will contain a plug-like member 30 equipped with an elongated extension portion 70 and an enlarged thrust face 72 adapted for engaging an axial end face 71 of the floating shaft 56. The opposite end of the shaft 56 has a thrust face 61 for engaging a thrust wear member 63. With the plug member 30 engaged within the opening 33 by means of threading or the like, the axial position of the floating shaft 56 will be maintained as shown in FIG. 4 so that the splines 58 will engage the teeth of the gear 60 concurrently with the engagement of the splines 53 and 55 of the gear 50 and floating shaft 56 respectively.

By reference to FIGS. 3, 5, and 6, it will be appreciated that the cover plate member 20 is equipped with an aperture or compartment means 35 within which is disposed threaded pull bolt means 34. The aperture 35 is a storage compartment for the pull bolt 34 and its accommpanying washer 74 when the bolt means is not in use, as shown in FIG. 5.

When it is desired to disengage the final drive from the traction means of the vehicle for towing or the like, the plug member 30 is withdrawn from the opening 33 and replaced by the puller bolt means 34 and its washer 74 as shown most clearly in FIG. 6. When inserted in the opening 33, the threaded shank portion 37 of the bolt means 34 will engage at correspondingly threaded internal passage 75 of the floating shaft means 56. By turning the bolt 34, the floating shaft 56 will be drawn axially towards the opening 33 to a point where the splines 58 no longer engage the teeth of the gear 60 at which point a complete disconnection of the final drive for the sprocket 12 will have occurred. The washer 74 takes the wear occasioned by turning the bolt means 34 so as to protect the cap means 32 and provides a bearing surface for the head of the bolt 34 while pulling the shaft 56.

While the invention has been described with particular reference to the preferred embodiment, it should be apparent that many variations and modifications are possible within the purview of the inventive concepts. No limitations with respect to these variations and modifications are intended except those which are implicit in the scope of the appended claims.

I claim:

1. Final drive means for a machine having first and second oppositely disposed traction means, said final drive means including interchangeable housing means for use on the final drive means for either said first or second traction means, said housing means being interchangeable without modification, said housing means having removable cover plate means, said cover plate means having an opening located centrally of said cover plate means, said housing means further includng cap member means for selectively removable disposition over said opening to substantially close off said opening, said cap member means including first aperture means for providing access to internal components of said final drive means for selectively rendering said final drive inoperative, said first aperture means being located concurrently centrally of said cap member means and said opening, first plug means normally removably disposed within said first aperture means to close said first aperture means.

2. The invention of claim 1 wherein said cover plate means also includes second and third aperture means for draining fluid from said final drive housing means angularly spaced apart adjacent the periphery of said cover plate means, second and third selectively removable plug means for closing said second and third drain aperture means respectively.

3. The invention of claim 2 wherein said cover plate means further includes storage bore means, said storage bore means including a threaded portion, threaded pull bolt means selectively removably threadably disposed within said storage bore means, said threaded pull bolt means for selectively functioning to act upon said internal components to render said final drive inoperative.

4. The invention of claim 1 wherein said final drive means further include movable input means for connection with and transmission of input torque from a source of input torque, said final drive means further including movable output means for connection with and transmission of torque to said traction means, said internal components including disconnect means for selectively connecting and disconnecting said movable input means and said movable output means.

5. The invention of claim 4 wherein said movable input means include a first gear member and said movable output means include a second gear member, said disconnect means including an axially floating shaft member having first and second spline means for engaging respectively the gear teeth of said first and second gear members.

6. Final drive means for a machine having first and second oppositely disposed traction means, said final drive means including interchangeable housing means for use on the final drive means for either said first or second traction means, said housing means having removable cover plate means, said cover plate means having an opening located centrally of said cover plate means, said housing means further including cap member means for selectively removable disposition over said opening to substantially close off said opening, said cap member means including first aperture means for providing access to internal components of said final drive means for selectively rendering said final drive inoperative, said first aperture means being located concurrently centrally of said cap member means and said opening, first plug means normally removably disposed within said first aperture means to close first aperture means, said final drive means further including movable input means for connection with and transmission of input torque from a source of input torque, said final drive means further including movable output means for connection with and transmission of torque to said traction means, said internal components including disconnect means for selectively connecting and disconnecting said movable input means and said movable output means, said movable input means including a first gear member and said movable output means include a second gear member, said disconnect means including an axially floating shaft member having first and second spline means for engaging respectively the gear teeth of said first and second gear members, said first and second spline means are disposed upon the axially opposite end portions of said floating shaft member, and wherein said shaft member has first and second thrust bearing surfaces at the axially opposite ends thereof proximate said first and second spline means.

7. The invention of claim 6 wherein said first plug means includes an elongated extension portion having enlarged thrust means thereof for engaging said first thrust bearing surface of said floating shaft member to limit axial movement of said floating shaft member toward said first aperture means.

8. The invention of claim 6 wherein said cover plate means further includes storage bore means, said storage bore means including a threaded portion, threaded pull bolt means selectively removably threadably disposed within said storage bore means.

9. The invention of claim 8 wherein said floating shaft member includes a threaded axial passage having thread means for cooperating with said threaded pull bolt means for selectively altering the axial position of said floating shaft member upon turning of said threaded pull bolt means when said means are in engagement with said threaded axial passage.

10. The invention of claim 9 wherein aid first and second spline means of said floating shaft means are disposed about the external periphery of said shaft means, said first gear member having a hub portion with axial passageway means for slidably receiving said floating shaft means, said teeth of said first gear member for engaging said first spline means of said shaft means being disposed within said axial passageway means.

11. The invention of claim 9 further including washer means for interposition between said threaded pull bolt means and said cap member means to prevent wear on said cap member means when said pull bolt means is turned to alter the axial position of said floating shaft member to disengage the splines of said shaft member from the teeth of one of said first or second gear members to disengage said final drive means from said traction means.

* * * * *